US008489825B2

(12) United States Patent
Van Berkel

(10) Patent No.: US 8,489,825 B2
(45) Date of Patent: Jul. 16, 2013

(54) METHOD OF STORING DATA, METHOD OF LOADING DATA AND SIGNAL PROCESSOR

(75) Inventor: Cornelis H. Van Berkel, Heeze (NL)

(73) Assignee: ST-Ericsson SA, Plan-les-Ouates (CH)

( * ) Notice: Subject to any disclaimer, the term of this patent is extended or adjusted under 35 U.S.C. 154(b) by 142 days.

(21) Appl. No.: 12/450,819

(22) PCT Filed: Apr. 11, 2008

(86) PCT No.: PCT/IB2008/051388
§ 371 (c)(1),
(2), (4) Date: Apr. 23, 2010

(87) PCT Pub. No.: WO2008/126041
PCT Pub. Date: Oct. 23, 2008

(65) Prior Publication Data
US 2010/0211749 A1 Aug. 19, 2010

(30) Foreign Application Priority Data
Apr. 16, 2007 (EP) .................................. 07106203

(51) Int. Cl.
*G06F 12/00* (2006.01)
(52) U.S. Cl.
USPC .................................. 711/154; 711/E12.084
(58) Field of Classification Search
None
See application file for complete search history.

(56) References Cited

U.S. PATENT DOCUMENTS

| 3,700,873 | A | * | 10/1972 | Yhap | 708/100 |
|---|---|---|---|---|---|
| 5,329,474 | A | * | 7/1994 | Yamada | 708/404 |
| 5,794,061 | A | | 8/1998 | Hansen et al. | |
| 6,374,376 | B1 | * | 4/2002 | Byrd | 714/718 |
| 7,536,431 | B2 | * | 5/2009 | Goren et al. | 708/831 |
| 2004/0120518 | A1 | * | 6/2004 | Macy et al. | 380/29 |
| 2004/0122887 | A1 | * | 6/2004 | Macy | 708/607 |
| 2004/0150543 | A1 | * | 8/2004 | Wang et al. | 341/143 |
| 2004/0153682 | A1 | * | 8/2004 | Fuehrer et al. | 713/400 |
| 2004/0243657 | A1 | * | 12/2004 | Goren et al. | 708/607 |

FOREIGN PATENT DOCUMENTS

| WO | WO 03/100599 A2 | 12/2003 |
|---|---|---|
| WO | WO 2006/033056 A2 | 3/2006 |
| WO | WO 2006033056 A2 * | 3/2006 |

OTHER PUBLICATIONS

International Preliminary Report on Patentability dated Oct. 20, 2009 in connection with PCT Patent Application No. PCT/IB2008/051388.
Written Opinion dated Oct. 20, 2009 in connection with PCT Patent Application No. PCT/IB2008/051388.
International Search Report dated Jul. 15, 2008 in connection with PCT Patent Application No. PCT/IB2008/051388.

* cited by examiner

*Primary Examiner* — Edward Dudek, Jr.
*Assistant Examiner* — Christopher Birkhimer
(74) *Attorney, Agent, or Firm* — Coats & Bennett, P.L.L.C.

(57) ABSTRACT

A method for storing a vector of process data elements (D1, ..., D8) that have a size of n bits from a register file (RF) into a memory (M) is described. The memory is arranged for storage of a vector of storage data elements in locations (M1, ..., M5) having a size of m bits, wherein m>n. The method comprises the steps of: exchanging bits (S2) between process data elements in the vector stored in mutually subsequent register elements, the exchanging resulting in a vector of modified data elements (DmI, ..., Dm8), shuffling (S3) groups of k subsequent bits in the resulting vector, —storing (S4) the resulting shuffled vector of modified data elements as a vector of storage data elements in the memory (M).

6 Claims, 5 Drawing Sheets

METHOD OF STORING DATA, METHOD OF LOADING DATA AND SIGNAL PROCESSOR

CROSS-REFERENCE TO RELATED APPLICATION(S)

The present application claims priority under 35 U.S.C. §365 to International Patent Application No. PCT/M2008/051388 filed Apr. 11, 2008, entitled "METHOD OF STORING DATA, METHOD OF LOADING DATA AND SIGNAL PROCESSOR". International Patent Application No. PCT/IB2008/051388 claims priority under 35 U.S.C. §365 and/or 35 U.S.C. §119(a) to European Patent Application No. 07106203.8 filed Apr. 16, 2007 and which are incorporated herein by reference into the present disclosure as if fully set forth herein.

FIELD OF THE INVENTION

The present invention relates to a method of storing data. The invention further relates to a method of loading data. The invention still further relates to a signal processor.

BACKGROUND

Signal processing e.g. for audio and video processing usually requires that the same instruction is repeated for a plurality of data elements of a vector. An example of such a processor, here an SIMD processor, is shown in FIG. 1. The SIMD processor shown comprises a vector memory M, a register file RF and a plurality of Functional Units FU1, ..., FUn.

The SIMD processor further has an instruction memory PM for storage of VLIW instructions, a VLIW controller CTRL coupled to the instruction memory and an addressing unit ACU+ for the memory.

The memory M has a storage capacity for a plurality of vectors, each comprising P words of m bits. For example P=8 and m=16. The functional units FUs support multiple operations in parallel on data stored in the register file, such as load and storage of data, multiplication, and multiply accumulate operations.

A load vector operation moves a vector from the SIMD memory M to the register file RF. A store vector operation moves a vector from the register file RF to the SIMD memory M.

In the SIMD processor the combination of register files plus functional units can be considered as P parallel data lanes that communicate with the memory having P parallel memory banks. For so-called inter-vector operations, the elementary operation is applied P times locally in each lane. So-called intra-vector operations work on the P elements of a single vector, and hence work across P lanes. Each of the P lanes is coupled to a respective memory bank.

Word sizes of data elements used by signal-processing applications (process data elements) often poorly match the word sizes of the memory locations of Digital Signal Processors (DSP). For example, a usual memory word size is 16 bits. However, an internal delay line of a DVB-T receiver has a capacity of 48 k samples of 10 bits. (48 k=3 frames of 8 complex samples of 2 words of 10 bits.) Mapping this onto the memory of a programmable DSP implies a mapping of 10 bit data elements to 16 bit storage locations. The overall memory requirements for this delay line thus increase from 480 kbit to 768 kbit [60% up!].

Ideally, this excess memory requirement is to be avoided by compression of data, so that the data elements to be stored in memory (storage data elements) have a size equal to that of the memory storage locations.

Compressed memory formats themselves are not new. Their implementation, however, imposes special challenges in the case of SIMD machines. By way of example this is illustrated with reference to an SIMD that processes vectors of P=8 words with a size of 16 bits. The so-called vector memory is a physical memory of lines of P×16 bits.

A conceptually simple solution to carry out a load operation of P=8 data elements of 10 bits from 5 compressed data elements (storage data elements) of 16 bits stored in the memory would be to introduce a multiplexer to spread an aligned vector across the P lanes. Likewise a store operation of P=8 data elements of 10 bits as 5 compressed data elements of 16 bits in the memory could be realized with such a multiplexer. This, however, would imply up to P sets of say 10 wires crossing the lane boundaries. Note that when compression for multiple data element sizes have to be supported (e, g. both 10 and 12 bits), such a multiplexer is needed for each size, for both load and for store operations. (And this would only support the case that both the compressed and the uncompressed vectors are aligned, requiring additional rotate operations.) As the VLSI layouts of SIMD machines are already wire limited, this would amount to a considerable area and power penalty.

SUMMARY OF THE INVENTION

It is an object of the invention to provide a method for storing data that allows for a more efficient storage of the data without necessitating complex additional data lines.

It is a further object of the invention to provide a method loading data that allows to reconstruct the data in the original format it had before it was stored without necessitating complex additional data lines.

It is a further object of the invention to provide a data processing apparatus that allows for a more efficient storage of the data without necessitating complex additional data lines.

It is a further object of the invention to provide a data processing apparatus that allows to load and reconstruct the data in the original format it had before it was stored without necessitating complex additional data lines.

According to the invention a method is provided for storing a vector of data elements that have a size of n bits from a register file into a memory, the memory being arranged for storage of a vector of storage data elements in locations having a size of m bits, wherein m>n, the method comprising the steps of:

exchanging bits between process data elements in the vector stored in mutually subsequent register file elements, the step of exchanging resulting in a vector of modified data elements,
 shuffling groups of k subsequent bits in the resulting vector,
 storing the resulting shuffled vector of modified data elements as a vector of storage data elements in the memory.

On the one hand the method of storing according to the invention efficiently uses the memory, by rearranging the data in the data elements so that it properly matches the size of the storage locations in the memory. On the other hand the method according the invention does not require superfluous wiring across the data lanes. It suffices for this purpose to reuse a shuffling facility, which only shuffles data on a relatively large granularity and to exchange data between mutually neighboring bit lanes.

Shuffle operations are already supported in some SIMD processors. A shuffle has two source vectors s and p, and one target vector t. With index i, $0 \leq i < P$, this operation can be specified by $t[i]=s[p[i]]$ for all i. In words, element i of target vector t is copy of the element from s specified by index p[i].

Properties of Shuffle Operations are:
1. A vector rotation by r places, $-P<r<P$ is a special case of a shuffle.
2. A shuffle followed by another shuffle on the result can be reduced to a single shuffle operation. In particular rotate+shuffle can be combined into a single shuffle.

Analogously a method according to the invention is provided for loading a vector of storage data elements that are stored in memory locations that have a size of m bits of a memory as a vector of process data elements that have a size of n bits into a register file, wherein m>n, the method comprising the steps of:
 retrieving a vector of storage data elements from the memory,
 applying a shuffling wherein two or more groups of k subsequent bits are exchanged in their entirety resulting in a shuffled vector,
 exchanging bits between pairs of data elements in the shuffled vector stored in subsequent register elements, the exchanging resulting in a vector of modified data elements.

According to the object of the present invention a digital signal processor comprises:
 one or more functional units,
 a register file comprising a first plurality of register elements for storing at least a vector of process data elements that have a size of n bits, a memory for storing at least one vector in a plurality of memory locations having a size of m bits, wherein m>n,
 a shuffle unit for shuffling data elements having a size of k bits of a vector,
 characterized by an exchange facility for exchanging bits between mutually subsequent data elements of a vector.

BRIEF DESCRIPTION OF THE DRAWING

These and other aspects are described in more detail with reference to the drawing. Therein.

DETAILED DESCRIPTION OF THE INVENTION

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

Figure 1:
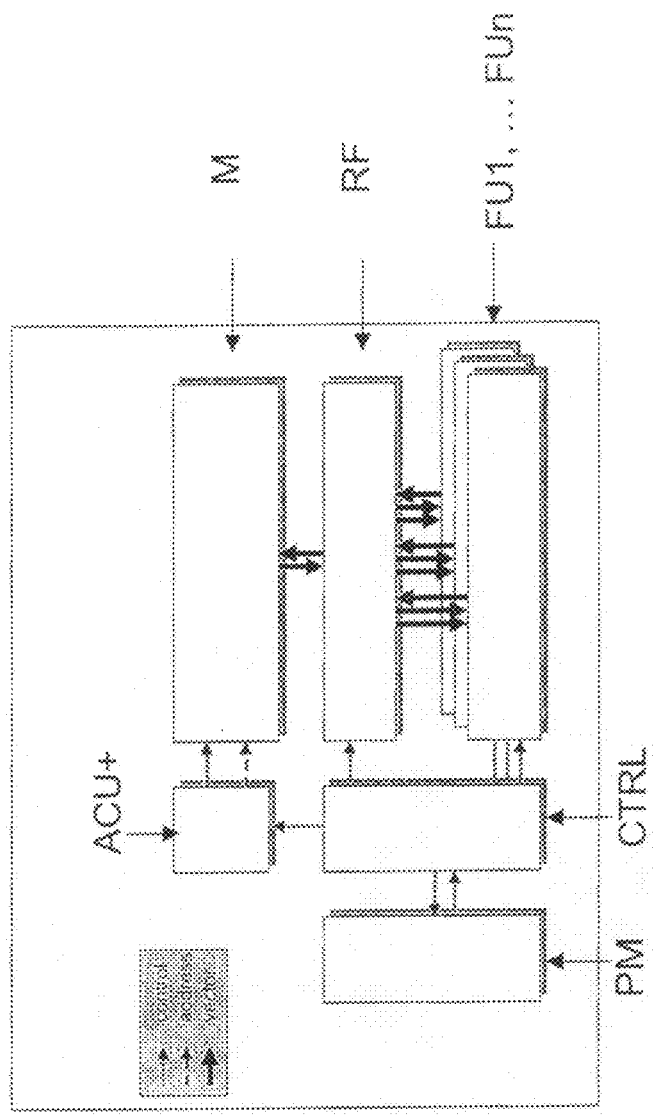
FIG. 1 shows a conventional vector processor.
Figure 2:
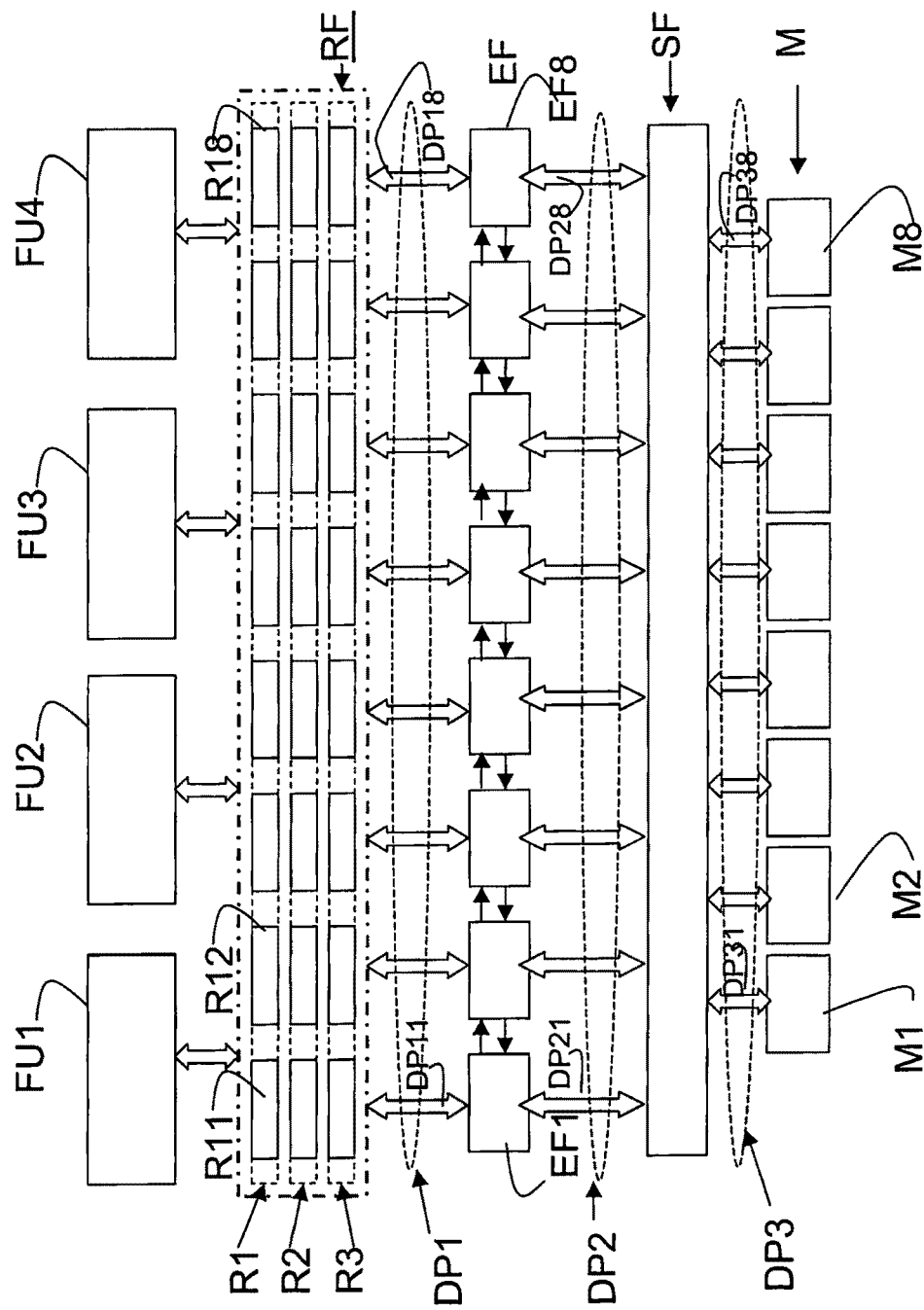
FIG. 2 shows a vector processor according to the invention,
 FIG. 3 schematically shows a first method according to the invention,
 FIG. 4 schematically shows the structure of the data in various stages of carrying out the method according to FIG. 3,
 FIG. 5 schematically shows a second method according to the invention,
 FIG. 6 schematically shows the structure of the data in various stages of carrying out the method according to FIG. 5.

FIG. 2 schematically shows a vector processor according to the present invention. The vector processor comprises a plurality of functional units FU1, . . . FUn, that are coupled to a register file RF. The register file has a set of registers R1, R2, R3. Each register is capable of storing a vector with data elements in respective register elements R11, . . . , R18.

The vector elements have a size of n bits e.g. 10 or 12 that is smaller than the size, e.g. 16 bits, of the register elements.

The register files are coupled with a first data path DP1, having parallel data lanes DP11, . . . , DP18 to an exchange facility EF, comprising a plurality of exchange units EF1, . . . , EF8. Each exchange unit EFj is capable of exchanging data bits with its neighboring exchange unit(s). The exchange units EFj are coupled to a shuffle unit SF via a second data path DP2 having parallel data lanes DP21, . . . , DP28.

The $n^{th}$ data lane of the $m^{th}$ data path is indicated as DPmn. Data lanes in general are also indicated as DLi.

The exchange facility EF may be arranged for exchanging data elements between subsequent register elements according to a predetermined pattern. For example, for compressing process data elements having a size of 10 bits, Such an exchange facility is suitable if process data of a single type has to be compressed. In a preferred embodiment however, the exchange facility is controllable. In this way multiple values of m can be supported.

On its turn, the shuffle unit SF is coupled via a data path DP3, with data lanes DP31, . . . , DP38 to a memory M. Each data lane DP31, . . . , DP38 is coupled to a respective memory bank. The memory M is capable of storing at least one vector in a plurality of memory locations having a size of m bits, wherein m>n. For example m=16.

The shuffle unit SF is capable of shuffling data elements having a size of k bits of a vector.

Figure 3:
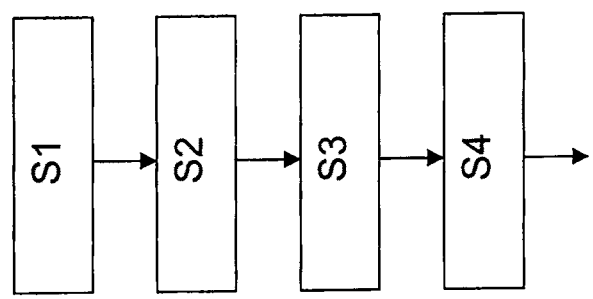
Figure 4:
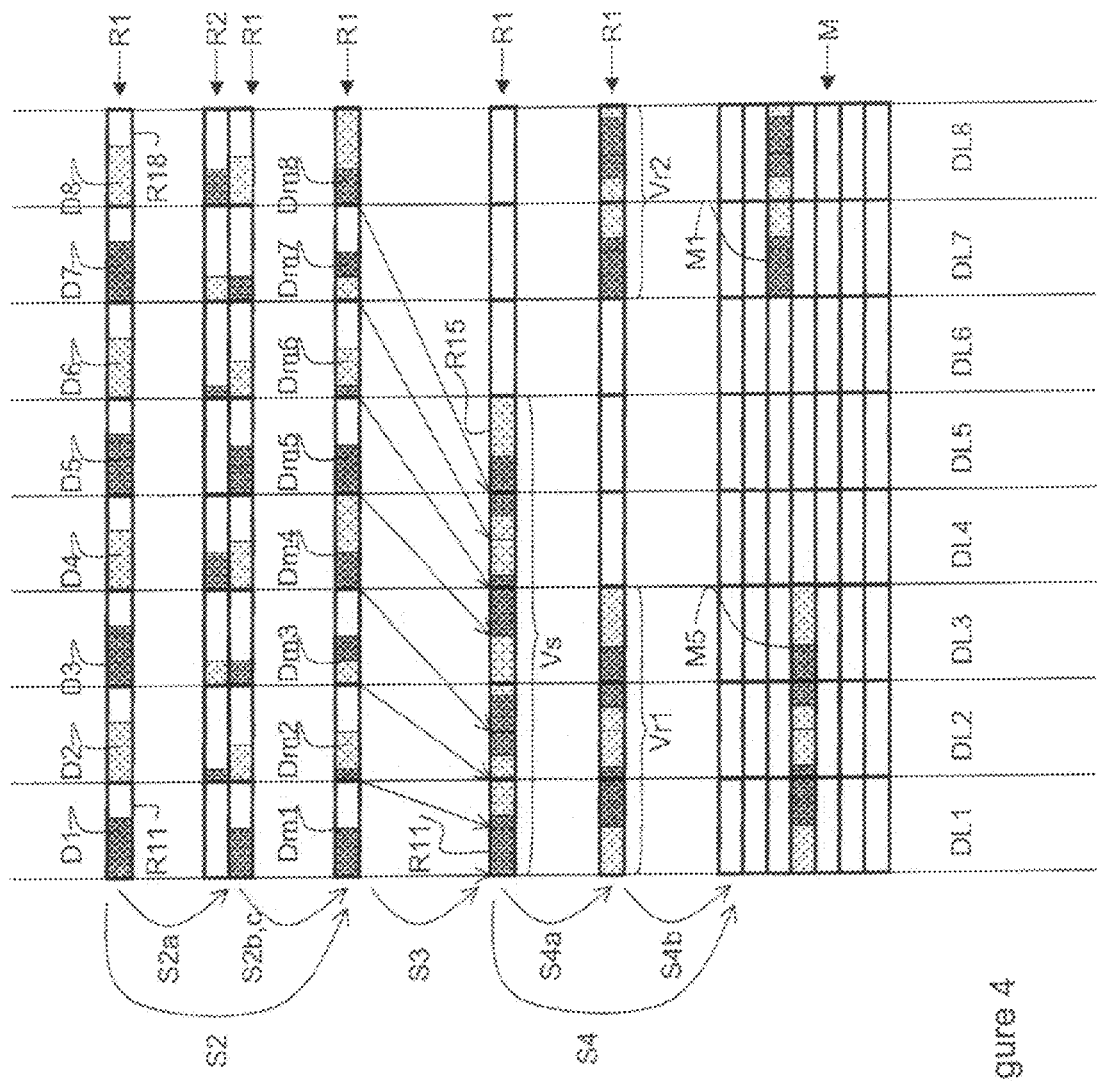

FIG. 3 schematically shows a method according to the invention for storing a vector of first process data elements D1, D2, . . . , D8 into a memory. Storing a vector amounts to moving a vector from a particular register to a particular location in the vector memory. FIG. 4 shows the structure of the data in various stages of carrying out the method according to FIG. 3. In the embodiment shown, the process data elements having a size of n=10 bits, are temporarily present in respective register elements R11, . . . , R18 of a register R1 of a register file RF. The size of the register elements is 16 bits. The memory M is arranged for storage of storage data elements of vectors in locations M1, . . . , M5. The locations M1, . . . , M5 of the memory have a size m greater than the size n of the first data elements D1, . . . , D8. In this case m=16 bits.

The method comprises the following steps:
 In a first step S1 the size n of the process data elements D1-D8 is compared with the size m of the memory locations M1-M5. This step is superfluous if the size of the process data elements is always the same, and the outcome of this comparison is known beforehand.
 In the second step S2 bits are exchanged between mutually subsequent process data elements D1-D8 in the vector in an amount and a direction dependent on the comparison and on the location of the process data elements within the vector. Exchanging bits in step S2 results in a vector of modified data elements Dm1-Dm8.

In this second step S2 j*2 mod 8 bits of data element Dj are transferred to the subsequent data element Dj+1. E.g. two bits are transferred from the first process data element D1 to the second process data element D2, four bits from the second process data element D2 to the third process data element. Zero bits are transferred from the fourth to the fifth process data element.

The resulting modified data elements Dm1-Dm8, either have 8 bits, e.g. Dm1, Dm2 or 16 bits, e.g. Dm8.

In the embodiment shown the step S2 of exchanging is carried out in three sub steps:

S2a: storing the bits to be transferred into an auxiliary register R2.
S2b: rotating the bits not to be transferred
S2c: merging the rotated bits with the transferred bits.

In step S3 groups of k subsequent bits (here k=8) in the resulting vector Dm1-Dm8 are shuffled. Accordingly, each of the registers elements R11-R15 used for storing the modified data elements comprises 16 bits of data, and is fully occupied therewith.

In step S3 the data is shuffled according to the following table. The source of the data is indicated in the left column and the destination in the second column of the table. Therein $R1s_L$ and $R1s_R$ represent the left and the right 8 bits of register element $R1s$.

| Source | Destination |
|---|---|
| $R11_L$ | $R11_L$ |
| $R12_L$ | $R11_R$ |
| $R13_L$ | $R12_L$ |
| $R14_L$ | $R12_R$ |
| $R14_R$ | $R13_L$ |
| $R15_L$ | $R13_R$ |
| $R16_L$ | $R14_L$ |
| $R17_L$ | $R14_R$ |
| $R18_L$ | $R15_L$ |
| $R18_R$ | $R15_R$ |

Then, in step S4 the resulting shuffled vector Vs of modified data elements is stored as a vector of second data elements in the memory M.

As the shuffled vector occupies a lower number of register elements than the number of memory banks, the alignment of the vector in the memory M will need to shift each time a new shuffled vector Vs is stored. Consequently, storage S4 of the next shuffled vector Vs is carried out as two sub steps S4a, S4b. In sub-step S4a the shuffled vector Vs is rotated by a required number of data units k, e.g. data units of 8 bits, and a rotated vector having parts Vr1,Vr2 is obtained. In the subsequent sub-step S4b the rotated vector Vr1+Vr2 is written into the memory. Writing in step S4b can take place in a masked mode, so as not to overwrite memory locations outside the range destinated to be written by the compressed data. Step S4a can be combined with step S3 into a single shuffle/rotate operation.

Figure 5:
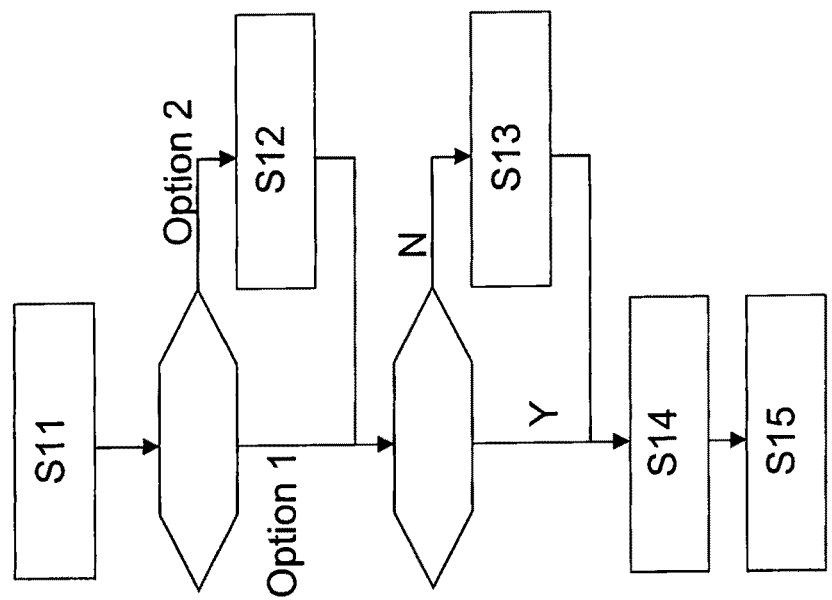
Figure 6:
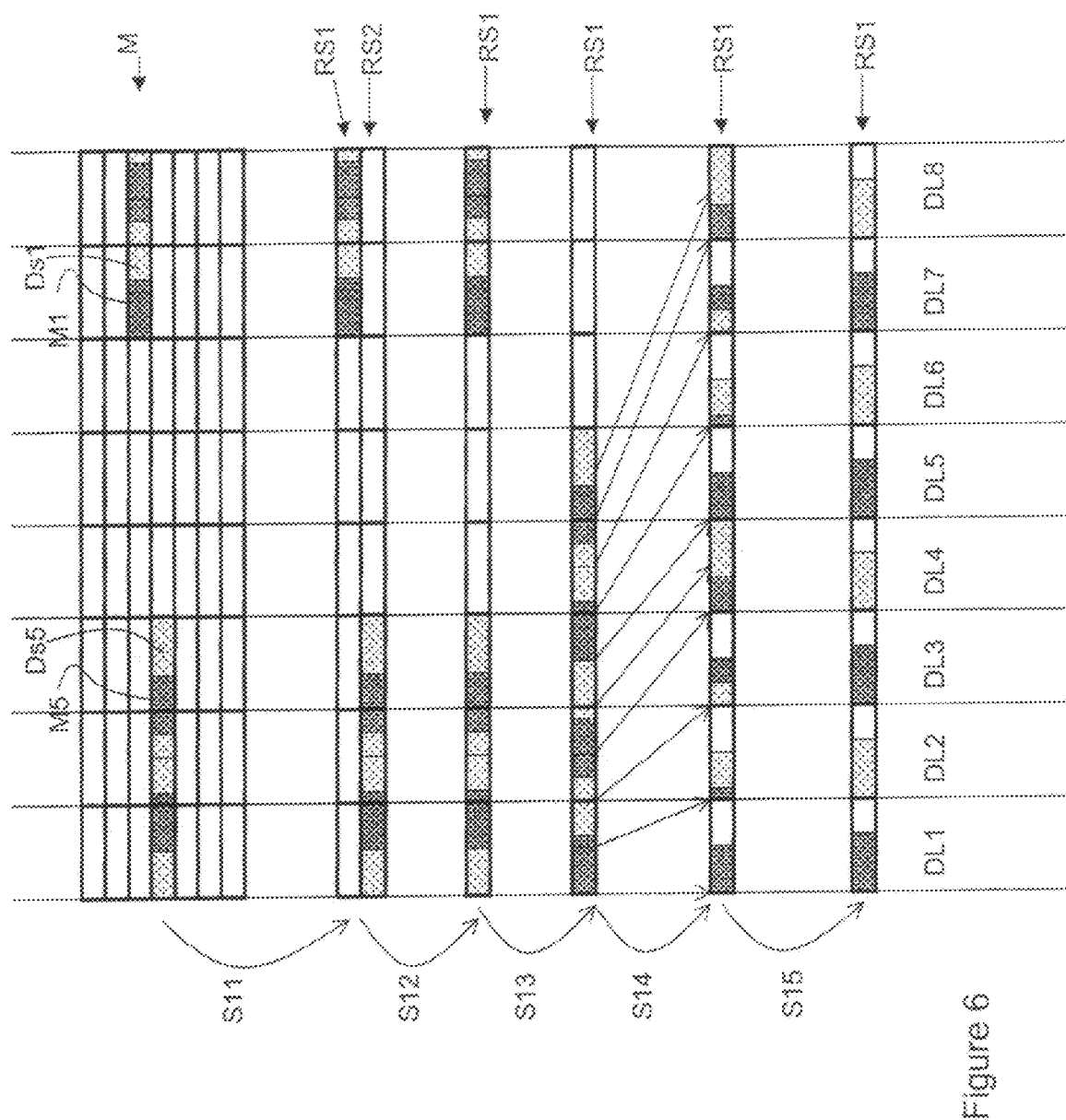

FIG. 5 schematically shows a method for loading a vector, that is, moving a vector from the vector memory to a particular register. FIG. 6 shows the structure of the data in various stages of carrying out the method according to FIG. 5. The vector comprises stored data elements Ds1, . . . , Ds5 that are stored in memory locations M1, . . . , M5. The stored data elements have a size of m bits equal to the size of the memory locations, e.g. 16 bits and the data has to be stored as a vector of process data elements with a size of n bits into a register file, wherein m>n. In the embodiment shown n is 10 bits. The method comprises the following steps.

In step S11 a vector of stored data elements Ds1-Ds5 is retrieved from the memory M. dependent on whether the stored data elements are stored in one or two memory lines, the vector is retrieved in one or two memory cycles and stored in one or two registers (RS1, RS2). In case the data elements are stored in two memory lines (option 2), as shown in the example an additional step S12 is carried out, wherein all data is combined into a single register, here RS1. Subsequent to step S12, or directly after step S11, in case of option 1, it is verified whether the data is aligned in the register R1.

If the retrieved data is aligned in the register, (option Y) control flow continues with step S14. Otherwise first an alignment step (S13) is carried out in order to obtain alignment.

In step S14 a shuffling is applied, wherein two or more groups of k subsequent bits (e.g. 8) are exchanged in their entirety resulting in a shuffled vector.

The result of steps S13 ($D_{S13}$) and S14 ($D_{S14}$) is illustrated in the following table:

| Source | $D_{S13}$ | $D_{S14}$ |
|---|---|---|
| $R17_L$ | $R11_L$ | $R11_L$ |
| $R17_R$ | $R11_R$ | $R12_L$ |
| $R18_L$ | $R12_L$ | $R13_L$ |
| $R18_R$ | $R12_R$ | $R14_L$ |
| $R11_L$ | $R13_L$ | $R14_R$ |
| $R11_R$ | $R13_R$ | $R15_L$ |
| $R12_L$ | $R14_L$ | $R16_L$ |
| $R12_R$ | $R14_R$ | $R17_L$ |
| $R13_L$ | $R15_L$ | $R18_L$ |
| $R13_R$ | $R15_R$ | $R18_R$ |

Steps S13 and S14 can be combined into a single shuffle step.

Subsequently in step S15 bits are exchanged between pairs of subsequent second data elements in the shuffled vector in an amount and a direction dependent on the values for m and n, and on the location of the second data elements within the shuffled vector. The exchanging resulting in a vector of modified data elements that represent the process data elements.

The number of bits to be exchanged is schematically illustrated in the following table. Therein DPi,i+1 indicates the data lanes between which the data is exchanged and Ni,i+1 indicates the number of a bits that is exchanged. A positive sign indicates that bits are exchanged from data lane DPi to DPi+1 and a negative sign indicates the opposite direction.

| DPi, i + 1 | Ni, i + 1 |
|---|---|
| 1, 2 | −2 |
| 2, 3 | −4 |
| 3, 4 | −6 |
| 4, 5 | 0 |
| 5, 6 | −2 |
| 6, 7 | −4 |
| 7, 8 | −6 |

Different options are possible to exchange data between data elements stored in subsequent register elements R11-R18. What options are available also depends on the size k of the data units handled by the shuffle facility SF. First suppose that the size k corresponds to the size of the memory locations.

One option is to lend a number of bits to the next data element (lending method). This step can be repeated with following words until a data element is obtained having a number of bits equal to the number of bits of the storage locations in the memory M.

This method can be described by the following procedure:

```
nlend = n
For Iel = 2 to Nel
    if (nlend + n) ≦ m then
        add nlend bits of data element Iel−1 to data element Iel.
    nlend = nlend + n
```

```
    else
        nlend = 0
    endif
next
```

Consider for example a vector of process data elements having a size n of 4 bits, and a memory having locations with a size of 16 bits, then the first process data element lends 4 bits to the second process data element, the second process data element lends 8 bits to the third process data element, and the third process data element lends 12 bits to the fourth process data element. The procedure repeats with the fifth process data element that lends 4 bits to the sixth process data element etc. Now every fourth process data element comprises 16 bit of data while the content of the other data elements has become superfluous. Subsequently the shuffling unit can reorder the data elements comprising 16 bits of data contiguously, and the resulting reordered sequence can be stored in memory resulting in a storage efficiency of 100%.

In order to improve storage efficiency it is preferable, but not necessary that the size m of the memory locations is a plurality of the number of bits in the process data elements. Suppose for example that the number n=5. By applying the procedure above, every third process data element comprises 15 relevant bits. By rearranging these third process data elements in subsequent register elements using the shuffling unit, the relevant data can be stored with an efficiency of 93% instead of 31%. The only additional required data lines are those to shift data between two subsequent register elements.

One option is to borrow a number of bits from the next process data element (borrow-method). In the example described above this implies that for the first process data element the number of bits is completed to 16, using 6 bits from the second process data element. The second process data element now has 4 bits and the number of bits is completed to 8, using 4 bits from the third process data element. The third process data element now having 6 bits, is completed with 2 bits from the fourth process data element etc.

For the more general case the algorithm can be described as follows.

```
nrem = n
For Iel = 1 to Nel−1 "For all process data elements in the vector
if nrem = k "don't borrow"
else
if nrem < k then
add k−nrem bits of process data element Iel +1 to process data element Iel
nrem = nrem+n−k
else
add m−nrem bits of process data element Iel +1 to process data element Iel
nrem = n − (m−nrem)
end if
End For
```

If the number of bits in a process data element is less than the size of the storage locations in the memory, but more than the granularity k handled by the shuffle unit, the "lend-method" may be used, wherein a superfluous number of bits in a process data element is carried into a next process data element.

Assume for example that the number of bits n in each process data element is 10, that the size k handled by the shuffle unit is 8 bits and that the size of the memory locations m is 16 bits, then the first process data element lends 2 bits to the next process data element. The second process data element, now having 12 bits lends 4 bits to the third process data element etc. For the more general case the algorithm can be described as follows.

```
nrem = n−k (number of bits that is carried into the next process data element)
For Iel = 2 to Nel (For all process data elements in the vector)
add nrem bits of process data element Iel − 1 to data element Iel
nsum = n + nrem
if nsum = m then nrem = 0
else nrem = nsum−k
End For
```

The number of bits in the process data elements of the first vector may be less than k, for example n=6 and k=8. According to the lend-method a number of 6 bits of the first process data-element is lend to the next process data-element. The second process data element now has 12 bits and lends 4 bits to the third process data element, etc.

For the more general case the algorithm can be described as follows.

```
nrem = n
For Iel = 1 to Nel−1 "For all process data elements in the vector
nrem bits of process data element Iel − 1 to data element Iel
if (nrem +n) > k then
nrem = nrem + n − k
else
nrem = nrem+n
endif
End For
```

When adding bits of a process data element to a neighboring process data element, the resulting group of bits may be ordered arbitrarily, as long as they are arranged contiguous, and the ordering is consistent with the algorithm used for loading data from the memory.

For the present invention it is not relevant how the locations are arranged in the memory. The locations may be arranged for example sequentially. However a fast access is possible if the locations are accessible in parallel.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A method for storing a vector of process data elements that have a size of n bits from a register file into a memory, the memory arranged for storage of a vector of storage data elements in locations having a size of m bits, wherein m>n, the method comprising:

exchanging bits between process data elements in the vector stored in mutually subsequent register elements, the exchange producing a vector of modified data elements, whereby the size of at least one modified data element is different from the size of another modified data element;

shuffling groups of k subsequent bits in the produced vector whereby for at least one group of k subsequent bits, k has a value which is different from n and m; and storing the shuffled vector of modified data elements as a vector of storage data elements in the memory.

2. A method for loading a vector of storage data elements that are stored in memory locations that have a size of m bits of a memory as a vector of process data elements that have a size of n bits into a register file, wherein m>n, the method comprising:

retrieving a vector of storage data elements from the memory;

shuffling two or more groups of k subsequent bits such that the k subsequent bits are exchanged in their entirety whereby for at least one group of k subsequent bits, k has a value which is different from n and m to produce a shuffled vector, the shuffled vector comprising a plurality of data elements wherein the size of at least one data element is different from the size of another data element; and exchanging bits between pairs of data elements in the shuffled vector stored in subsequent register elements, the exchanging producing a vector of modified data elements.

3. A digital signal processor, comprising:

one or more processing units;

a register file comprising a first plurality of register elements configured to store at least a vector of process data elements that have a size of n bits;

a memory configured to store at least one vector in a plurality of memory locations having a size of m bits, wherein m>n;

a shuffle facility configured to shuffle data elements having a size of k bits of a vector whereby for at least one data element k has a value which is different from n and m; and an exchange facility configured to read a vector from the register file, exchange fewer than all bits between mutually subsequent data elements of the vector, and store the vector to the register file.

4. The digital signal processor according to claim 3, wherein m=p*k, and p is a positive integer.

5. The digital signal processor according to claim 4, wherein the exchange facility is controllable.

6. The digital signal processor, according to claim 4, wherein the shuffle facility is further configured to be used to align the data when loading data from memory or to rotate the data when retrieving the data from memory.

* * * * *